US010440582B2

(12) United States Patent
Takahashi et al.

(10) Patent No.: US 10,440,582 B2
(45) Date of Patent: Oct. 8, 2019

(54) MOBILE STATION AND UPLINK DATA TRANSMISSION METHOD

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/110,871

(22) PCT Filed: Jan. 21, 2015

(86) PCT No.: PCT/JP2015/051473

§ 371 (c)(1),
(2) Date: Jul. 11, 2016

(87) PCT Pub. No.: WO2015/115265

PCT Pub. Date: Aug. 6, 2015

(65) Prior Publication Data

US 2016/0337866 A1 Nov. 17, 2016

(30) Foreign Application Priority Data

Jan. 31, 2014 (JP) ................................ 2014-017981

(51) Int. Cl.
*H04W 16/14* (2009.01)
*H04W 76/15* (2018.01)
(Continued)

(52) U.S. Cl.
CPC ............ *H04W 16/14* (2013.01); *H04L 5/001* (2013.01); *H04L 5/0091* (2013.01);
(Continued)

(58) Field of Classification Search
None
See application file for complete search history.

(56) References Cited

U.S. PATENT DOCUMENTS

2013/0136094 A1* 5/2013 Wei .................. H04W 52/0203 370/329
2015/0181470 A1* 6/2015 Chai ................ H04W 36/0005 455/438
(Continued)

FOREIGN PATENT DOCUMENTS

CN 102076031 A 5/2011
JP 2012-169867 A 9/2012
(Continued)

OTHER PUBLICATIONS

International Search Report issued in PCT/JP2015/051473 dated Mar. 31, 2015 (1 page).
(Continued)

*Primary Examiner* — Kodzovi Acolatse
(74) *Attorney, Agent, or Firm* — Osha Liang LLP

(57) ABSTRACT

A mobile station which performs communication using a same bearer over component carriers belonging to different base stations includes a reception unit configured to receive a message including identification information of a base station to which uplink data are to be transmitted; a determination unit configured to determine a base station to which uplink data are to be transmitted according to the received message; and a transmission unit configured to transmit uplink data to the determined base station.

6 Claims, 7 Drawing Sheets

(51) Int. Cl.
*H04L 5/00* (2006.01)
*H04W 72/04* (2009.01)
*H04W 36/00* (2009.01)

(52) U.S. Cl.
CPC ....... *H04W 72/0426* (2013.01); *H04W 76/15* (2018.02); *H04W 36/0069* (2018.08)

(56) References Cited

U.S. PATENT DOCUMENTS

2015/0223095 A1* 8/2015 Centonza .......... H04W 36/0088 455/67.11
2016/0066241 A1* 3/2016 Wu ....................... H04W 36/28 370/331
2016/0234788 A1* 8/2016 Noh ...................... H04W 52/34
2016/0234847 A1* 8/2016 Zhang ............... H04W 36/0055
2016/0255665 A1* 9/2016 Futaki ................... H04W 52/36 370/329
2017/0222876 A1* 8/2017 Van Der Velde ............................ H04W 36/0055
2017/0223578 A1* 8/2017 Hong .................. H04L 41/0803
2017/0257265 A1* 9/2017 Hong .................. H04L 41/0803

FOREIGN PATENT DOCUMENTS

WO 2012163423 A1 12/2012
WO 2013/104413 A1 7/2013

OTHER PUBLICATIONS

Written Opinion of the International Searching Authority issued in PCT/JP2015/051473 dated Mar. 31, 2015 (4 pages).
3GPP TR 36.842 V12.0.0; “3rd Generation Partnership Project; Technical Specification Group Radio Access Network; Study on Small Cell enhancements for E-UTRA and E-UTRAN; Higher layer aspects (Release 12)”; Dec. 2013 (74 pages).
Japanese Office Action for corresponding Japanese Application No. 2014-017981 dated Mar. 31, 2015 (6 pages).
Extended European Search Report issued in the counterpart European Patent Application No. 15744027.2, dated Dec. 2, 2016 (7 pages).
Office Action issued in corresponding European Patent Application No. 15744027.2, dated Oct. 12, 2017 (6 pages).
Office Action issued in the counterpart European Patent Application No. 15744027.2, dated Feb. 7, 2019 (6 pages).
Office Action issued in the counterpart Chinese Patent Application No. 201580003546.5, dated Dec. 25, 2018 (21 pages).

* cited by examiner (A)OPTION 1

(B)OPTION 3

FIG.6

*RadioResourceConfigDedicated* information element

```
-- ASN1START
RadioResourceConfigDedicated ::=     SEQUENCE {
    srb-ToAddModList                 SRB-ToAddModList       OPTIONAL,       -- Cond HO-Conn
    drb-ToAddModList                 DRB-ToAddModList       OPTIONAL,       -- Cond HO-toEUTRA
    drb-ToReleaseList                    DRB-ToReleaseList          OPTIONAL,        -- Need ON
【OMITTED】
}
【OMITTED】
DRB-ToAddModList ::=             SEQUENCE (SIZE (1..maxDRB)) OF DRB-ToAddMod
DRB-ToAddMod ::=SEQUENCE {
    eps-BearerIdentity                   INTEGER (0..15)          OPTIONAL,      -- Cond DRB-Setup
    drb-Identity                     DRB-Identity,
    pdcp-Config                          PDCP-Config              OPTIONAL,      -- Cond PDCP
    rlc-Config                           RLC-Config               OPTIONAL,      -- Cond Setup
    logicalChannelIdentity               INTEGER (3..10)          OPTIONAL,      -- Cond DRB-Setup
    logicalChannelConfig             LogicalChannelConfig OPTIONAL,       -- Cond Setup
    ...
    mac-IdentityForUL                INTEGER (0..3)               OPTIONAL,
}
【OMITTED】
-- ASN1STOP
```

FIG.7

*PDCP-Config* information element

```
-- ASN1START
PDCP-Config ::=                     SEQUENCE {
    discardTimer                    ENUMERATED {
                                            ms50, ms100, ms150, ms300, ms500,
                                            ms750, ms1500, infinity
    }                                                           OPTIONAL,           -- Cond Setup
    rlc-AM                              SEQUENCE {
        statusReportRequired            BOOLEAN
    }                                                           OPTIONAL,           -- Cond Rlc-AM
    rlc-UM                              SEQUENCE {
        pdcp-SN-Size                    ENUMERATED {len7bits, len12bits}
    }                                                           OPTIONAL,           -- Cond Rlc-UM
    【OMITTED】
    ...,
    [[  rn-IntegrityProtection-r10      ENUMERATED {enabled}OPTIONAL-- Cond RN
    ]],
    [[  pdcp-SN-Size-v1130              ENUMERATED {len15bits}  OPTIONAL,   -- Cond Rlc-AM2
    ]]
                  [[  mac-IdentityForUL          INTEGER(0..3)              OPTIONAL
                                                    ]]
}
-- ASN1STOP
```

MOBILE STATION AND UPLINK DATA TRANSMISSION METHOD

TECHNICAL FIELD

The present invention relates to a mobile station and an uplink data transmission method.

BACKGROUND ART

In an LTE-Advanced (Long Term Evolution-Advanced) system, CA (Carrier Aggregation) is under discussion to achieve higher throughput using a plurality of CCs (Component Carriers). According to CA, a primary cell (PCell: Primary Cell) and a secondary cell (SCell: Secondary Cell) are provided. The primary cell is reliable and used to maintain connectivity with a mobile station (UE: User Equipment). The secondary cell is additionally configured for a mobile station connecting to the primary cell.

According to CA, not only a plurality of CCs belonging to the same base station but also CCs belonging to different base stations can be used. Communication using CCs belonging to different base stations is referred to as "Dual Connectivity" (see 3GPP TR 36.842 V12.0.0 (2013-12)). In Dual Connectivity, a base station corresponding to a PCell is referred to as an "MeNB (Master eNB)" and a base station corresponding to an SCell is referred to as an "SeNB (Secondary eNB)". Dual Connectivity is useful when all CCs cannot be accommodated in a single base station or when higher throughput needs to be achieved in an area where an ideal backhaul cannot be adequately installed.

DISCLOSURE OF INVENTION

Problem(s) to be Solved by the Invention

As a downlink data transmission scheme in Dual Connectivity, a scheme to transmit downlink data using different bearers from different base stations (Option 1) and a scheme to transmit downlink data using the same bearer from different base stations (Option 3) are under discussion.

FIG. 1 shows architecture of downlink data transmission in Dual Connectivity. According to Option 1 shown in FIG. 1(A), a PDCP (Packet Data Convergence Protocol) entity is installed in an MeNB, where PDCP layer processing is performed such as header compression and ciphering for a packet transmitted or received over a CC of the MeNB. Similarly, a PDCP entity is installed in an SeNB, where PDCP layer processing is performed such as header compression and ciphering for a packet transmitted or received over a CC of the SeNB.

According to Option 3 shown in FIG. 1(B), a PDCP entity is installed in an MeNB, where PDCP layer processing is performed such as header compression and ciphering for a packet transmitted or received over CCs of both the MeNB and the SeNB.

In Option 3, while a downlink data transmission scheme is under discussion, an uplink data transmission scheme is not defined. In option 3, the following three patterns are possible for an uplink data transmission scheme:

(A) Uplink transmission data are transmitted to the MeNB;

(B) Uplink transmission data are transmitted to the SeNB; and (C) Uplink transmission data are transmitted to both the MeNB and SeNB.

A mobile station needs to identify which of the three patterns is used to transmit uplink data. Thus, it is a general object of the present invention to achieve uplink data transmission to a specified base station, when communication is performed using the same bearer over CCs belonging to different base stations.

Means for Solving the Problem(s)

In one aspect of the present invention, there is provided a mobile station which performs communication using a same bearer over component carriers belonging to different base stations, including:

a reception unit configured to receive a message including identification information of a base station to which uplink data are to be transmitted;

a determination unit configured to determine a base station to which uplink data are to be transmitted according to the received message; and a transmission unit configured to transmit uplink data to the determined base station.

In another aspect of the present invention, there is provided an uplink data transmission method in a mobile station which performs communication using a same bearer over component carriers belonging to different base stations, including the steps of:

receiving a message including identification information of a base station to which uplink data are to be transmitted;

determining a base station to which uplink data are to be transmitted according to the received message; and transmitting uplink data to the determined base station.

Advantageous Effect of the Invention

According to the present invention, it is possible to transmit uplink data to a specified base station, when communication is performed using the same bearer over CCs belonging to different base stations.

BRIEF DESCRIPTION OF THE DRAWINGS

FIG. 6 shows a first signal format used in an embodiment of the present invention.

FIG. 7 shows a second signal format used in an embodiment of the present invention.

DETAILED DESCRIPTION OF THE PREFERRED EMBODIMENTS

An embodiment of the present invention is described below with reference to the accompanying drawings.

In an embodiment of the present invention, a type of CA (carrier aggregation) where a mobile station performs communication using CCs (component carriers) belonging to different base stations is described. This type of CA is referred to as "Dual Connectivity".

Figure 2:
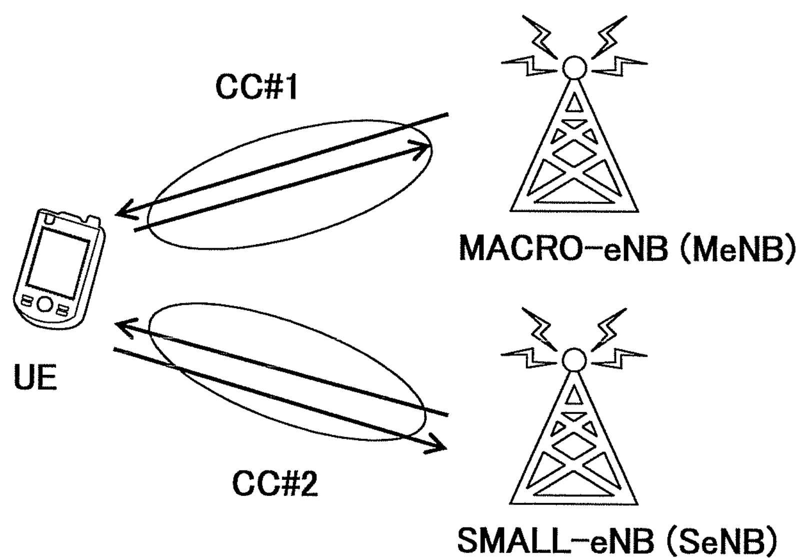
FIG. 2 shows a schematic diagram of a radio communication system to which an embodiment of the present invention can be applied.

FIG. 2 shows a schematic diagram of a radio communication system to which an embodiment of the present invention can be applied. In FIG. 2, a mobile station (UE) performs communication using CCS (CC#1 and CC#2) belonging to two base stations, thereby implementing Dual Connectivity. According to CA, a primary cell (PCell) and a secondary cell (SCell) are provided. The primary cell is reliable and used to maintain connectivity with a mobile station. The secondary cell is additionally configured for a mobile station connecting to the primary cell. In the example of FIG. 2, one of the CCs may be configured for a PCell and the other may be configured for a SCell, for example. It should be noted that in FIG. 2, two CCs are configured, but three or more CCs may be configured. A base station corresponding to a PCell is referred to as an "MeNB (Master eNB)" and a base station corresponding to an SCell is referred to as an "SeNB (Secondary eNB)". It should be noted that in FIG. 2, an MeNB is a macro-cell base station providing a larger coverage and an SeNB is a small-cell base station providing a smaller coverage, but the MeNB may correspond to a small-cell base station and the SeNB may correspond to a macro-cell base station.

Figure 1:
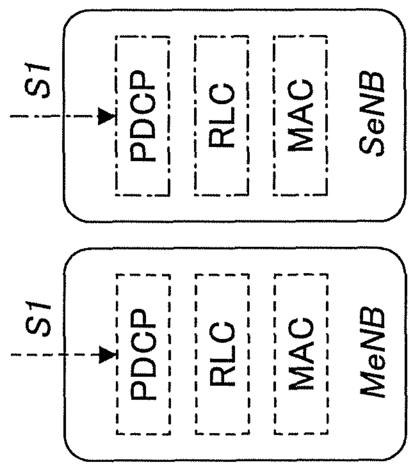
FIG. 1 shows bearers used to transmit downlink data in Dual Connectivity.
Figure 1:
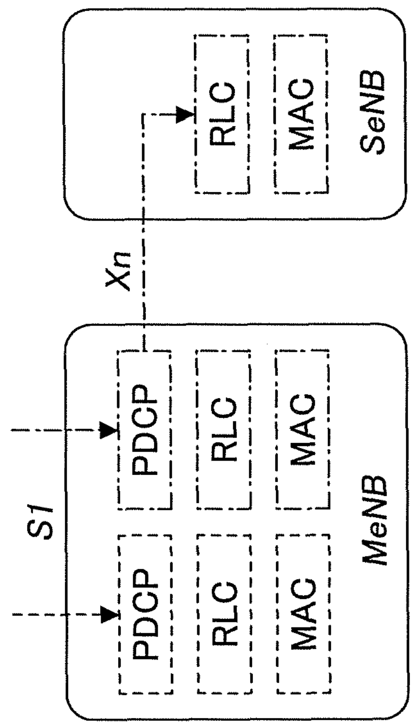
Figure 3:
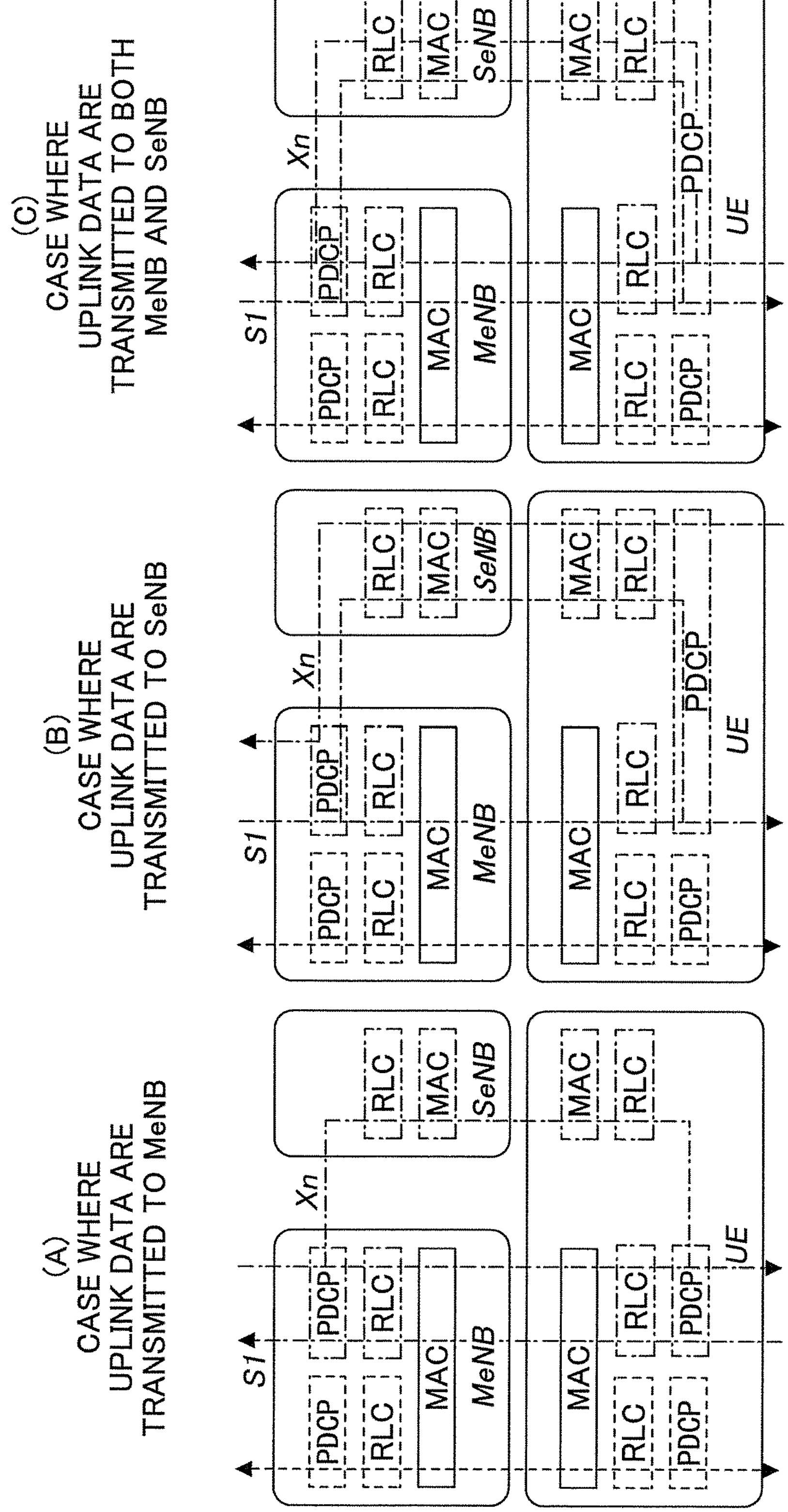
FIG. 3 shows bearers used to transmit uplink data in Dual Connectivity.

As shown in FIG. 1(B) (Option 3), in Dual Connectivity, downlink data can be transmitted from both an MeNB and an SeNB using the same bearer. FIG. 3 shows architecture of uplink data transmission corresponding to FIG. 1(B). FIG. 3 shows that two bearers are employed between an MeNB and a mobile station. One of the bearers (left side) is a bearer operating over a CC of an SeNB, and the other of the bearers (right side) is a bearer operating over CCs of both the MeNB and the SeNB.

When downlink data are transmitted using the same bearer from the MeNB and the SeNB, the following three patterns are possible for an uplink data transmission scheme:

(A) Uplink transmission data are transmitted to the MeNB:

(B) Uplink transmission data are transmitted to the SeNB; and (C) Uplink transmission data are transmitted to both the MeNB and SeNB.

FIG. 3(A) shows the case where downlink data are transmitted from both the MeNB and the SeNB, whereas uplink data are transmitted to the MeNB. FIG. 3(B) shows the case where downlink data are transmitted from both the MeNB and the SeNB, whereas uplink data are transmitted to the SeNB. FIG. 3(C) shows the case where downlink data are transmitted from both the MeNB and the SeNB, and uplink data are also transmitted to both the MeNB and the SeNB.

In an embodiment of the present invention, the base station (MeNB) indicates to the mobile station which of these three patterns is to be used, more specifically, to which of the base stations uplink data are to be transmitted. The mobile station transmits uplink data to the indicated base station to which uplink data are to be transmitted.

When downlink data are transmitted, a PDCP layer in the MeNB determines whether downlink data are to be transmitted from the MeNB or the SeNB. Thus, it is expected that a PDCP layer in the mobile station will determine whether uplink data are to be transmitted to the MeNB or the SeNB. A more specific configuration of the mobile station is described below.

Figure 4:
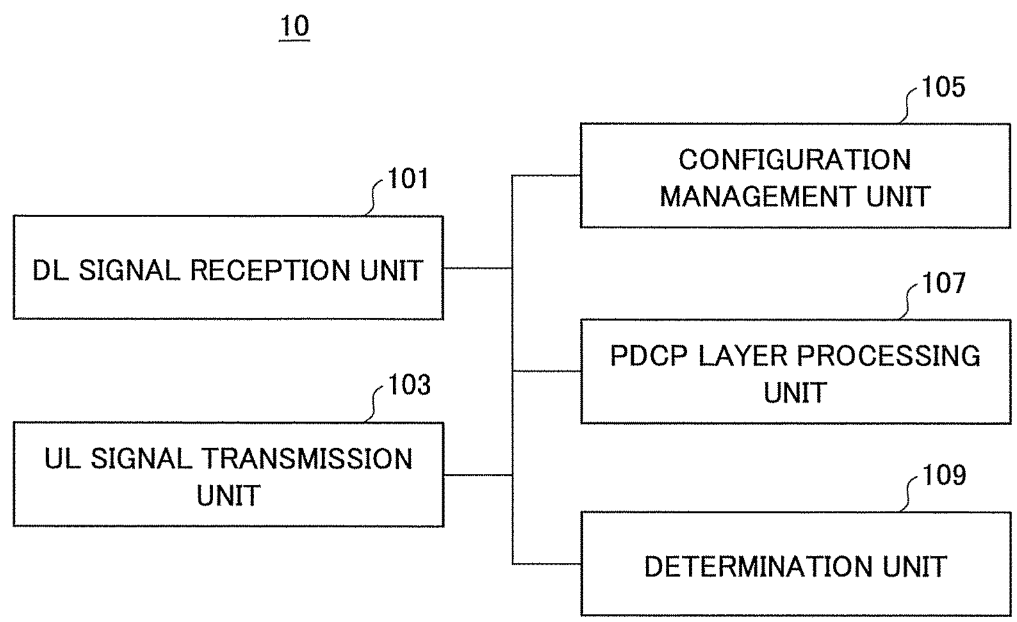
FIG. 4 shows a configuration diagram of a mobile station according to an embodiment of the present invention.

FIG. 4 shows a configuration diagram of a mobile station 10 according to an embodiment of the present invention. The mobile station 10 includes a DL (downlink) signal reception unit 101, a UL (uplink) signal transmission unit 103, a configuration management unit 105, a PDCP layer processing unit 107, and a determination unit 109.

The DL signal reception unit 101 receives downlink signals from a base station. Regarding architecture in which the same bearer is used over component carriers belonging to different base stations, the DL signal reception unit 101 receives a message including identification information of a base station to which uplink data are to be transmitted. This message may be an RRC Connection Reconfiguration message which is transmitted upon addition of an SCell or upon configuring a bearer in the SCell.

The UL signal transmission unit 103 transmits uplink signals to the base station. Regarding architecture in which the same bearer is used over component carriers belonging to different base stations, the UL signal transmission unit 103 transmits an RRC Connection Reconfiguration Complete message which is a response to the RRC Connection Reconfiguration message. In addition, the UL signal transmission unit 103 transmits uplink data to the base station to which uplink data are to be transmitted, which is determined in a PDCP layer.

The configuration management unit 105 manages configuration information transmitted from the base station to the mobile station. For example, the RRC Connection Reconfiguration message indicates PDCP layer configuration information/RRC (Radio Link Control) layer configuration information, MAC (Medium Access Control) layer configuration information, or the like to be used for the configured bearer. As described above, when a base station to which uplink data are to be transmitted is indicated by a message such as an RRC Connection Reconfiguration message, the configuration management unit 105 manages information about the indicated base station to which uplink data are to be transmitted. The base station to which uplink data are to be transmitted may be indicated by a MAC ID for identifying the base station.

The PDCP layer processing unit 107 performs PDCP layer processing such as header compression and ciphering for a packet. The packet processed in the PDCP layer is provided as a PDCP PDU (Protocol Data Unit) to an RLC (Radio Link Control) layer, the PDCP PDU is divided or PDCP PDUs are combined, and then transmitted to the base station in a MAC layer.

The determination unit 109 determines a base station to which uplink data are to be transmitted when the same bearer is used over component carriers belonging to different base stations. The base station to which uplink data are to be transmitted is determined based on identification information of the base station to which uplink data are to be transmitted, which is included in the message received by the DL signal reception unit 101. Thus, the base station to which uplink data are to be transmitted is determined based on information about the base station managed by the configuration management unit 105. For example, when an MeNB is specified in the RRC Connection Reconfiguration message as the base station to which uplink data are to be transmitted, the determination unit 109 determines that the base station to which uplink data are to be transmitted is the MeNB. For example, when an SeNB is specified in the RRC Connection Reconfiguration message as the base station to which uplink data are to be transmitted, the determination unit 109 determines that the base station to which uplink data are to be transmitted is the SeNB. For example, when both an MeNB and an SeNB are specified in the RRC Connection Reconfiguration message as the base stations to which uplink data are to be transmitted, the determination unit 109 determines that the base stations to which uplink data are to be transmitted are both the MeNB and the SeNB. Alternatively, when the base station to which uplink data are to be transmitted is not specified in the RRC Connection Reconfiguration message, the determination unit 109 may determine that the base stations to which uplink data are to be transmitted are both the MeNB and the SeNB.

As described above, since it is expected that the base station to which uplink data are to be transmitted will be determined in the PDCP layer of the mobile station, the determination unit 109 may be included in the PDCP layer processing unit 107.

Figure 5:
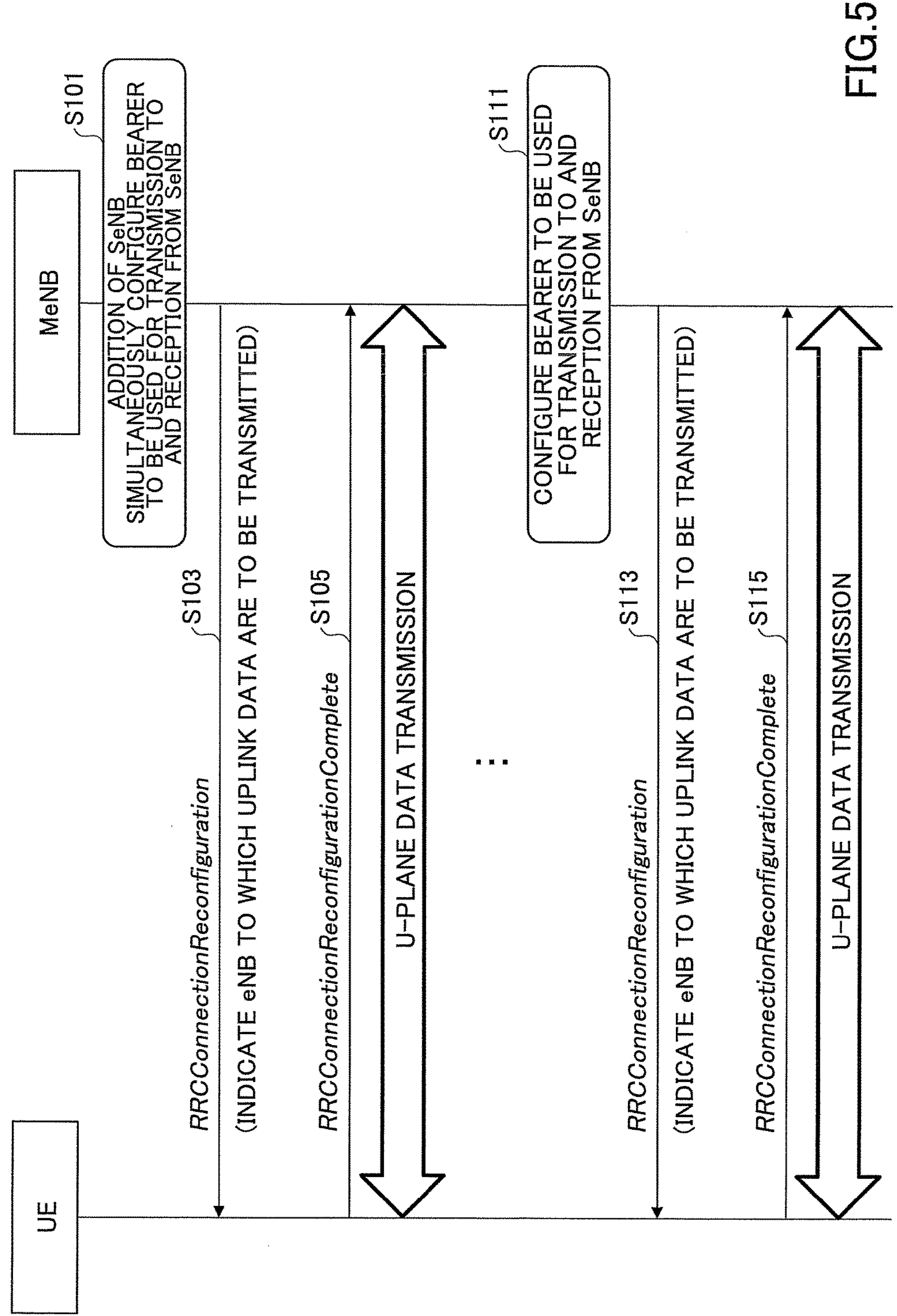
FIG. 5 shows a sequence diagram of an uplink data transmission method according to an embodiment of the present invention.

FIG. 5 shows a sequence diagram of an uplink data transmission method according to an embodiment of the present invention.

First, upon addition of a CC of an SeNB, that is, upon addition of an SCell, a base station (MeNB) configures a bearer to be used for transmission and reception over the CC of the SeNB (step S101).

The MeNB transmits an RRC Connection Reconfiguration message to a mobile station to indicate PDCP layer configuration information/RRC (Radio Link Control) layer configuration information and MAC (Medium Access Control) layer configuration information to be used for the configured bearer (step S103). In the RRC Connection Reconfiguration message, the MeNB indicates identification information (for example, MAC ID) of a base station to which uplink data are to be transmitted.

In response to the RRC Connection Reconfiguration message, the mobile station (UE) transmits an RRC Connection Reconfiguration Complete message to the MeNB indicating that a configuration is complete (step S105).

Then, the mobile station transmits uplink data over a U-plane according to the identification information of the base station to which uplink data are to be transmitted.

Steps S101-S105 show a sequence of configuring a bearer upon addition of an SCell. When a new bearer is configured while the SCell has been already added, a similar procedure can be used for the MeNB to indicate a base station to which uplink data are to be transmitted.

When a new bearer is configured in the MeNB (step S111), the MeNB transmits an RRC Connection Reconfiguration message to the mobile station to indicate PDCP layer configuration information/RRC (Radio Link Control) layer configuration information to be used for the configured bearer (step S113). In the RRC Connection Reconfiguration message, the MeNB indicates identification information (for example, MAC ID) of a base station to which uplink data are to be transmitted.

In response to the RRC Connection Reconfiguration message, the mobile station (UE) transmits an RRC Connection Reconfiguration Complete message to the MeNB indicating that a configuration is complete (step S115).

Then, the mobile station transmits uplink data over a U-plane according to the identification information of the base station to which uplink data are to be transmitted.

FIGS. 6 and 7 show specific signal formats where a base station to which uplink data are to be transmitted is indicated by an RRC Connection Reconfiguration message.

In FIG. 6, "mac-IdentityForUL" may be added to a DRB-ToAddMod IE (Information Element) in a RadioResourceConfigDedicated IE included in an RRC Connection Reconfiguration message to indicate identification information (for example, MAC ID) of a base station to which uplink data are to be transmitted. The RadioResourceConfigDedicated IE is a group of configuration items to be used for a mobile-station-specific configuration. As described above, when identification information is not included, it may be interpreted that both an MeNB and an SeNB are base stations to which uplink data are to be transmitted.

In FIG. 7, "mac-IdentityForUL" may be added to a PDCP-Config IE included in an RRC Connection Reconfiguration message to indicate identification information (for example, MAC ID) of a base station to which uplink data are to be transmitted. The PDCP-Config IE is a group of configuration items to be used for a PDCP layer configuration. As described above, when identification information is not included, it may be interpreted that both an MeNB and an SeNB are base stations to which uplink data are to be transmitted.

In the embodiments described above, a base station to which uplink data are to be transmitted is indicated by means of RRC signaling. However, a base station to which uplink data are to be transmitted may be indicated by means of a MAC Control Element message. By using a MAC Control Element message, a base station to which uplink data are to be transmitted can be more dynamically controlled.

According to the embodiments described above, when a mobile station performs communication using the same bearer over CCs belonging to different base stations, the mobile station can receive downlink data from both an MeNB and an SeNB and transmit uplink data to any one of the MeNB and the SeNB.

For example, when uplink data are transmitted to any one of the MeNB and the SeNB, the mobile station need not switch the destination of uplink data, thereby simplifying uplink data processing.

For convenience of explanation, the mobile station and the base station according to the embodiments of the present invention have been described with reference to functional block diagrams, but the mobile station and the base station may be implemented in hardware, software, or combinations thereof. In addition, two or more functional elements may be combined as appropriate. The method according to the embodiments of the present invention may be carried out in a different order from the order shown in the embodiments.

While the approaches are described above to transmit uplink data to a specified base station, when communication is performed using the same bearer over CCs belonging to different base stations, the present invention is not limited to the these embodiments, and variations, modifications, alterations, and substitutions can be made by those skilled in the art without deviating from the spirit of the present invention.

The present international application is based on and claims the benefit of priority of Japanese Patent Application No. 2014-017981 filed on Jan. 31, 2014, the entire contents of which are hereby incorporated by reference.

DESCRIPTION OF NOTATIONS

10 mobile station
101 DL signal reception unit
103 UL signal transmission unit
105 configuration management unit
107 PDCP layer processing unit
109 determination unit

The invention claimed is:

1. A mobile station which performs communication over component carriers belonging to different base stations, comprising:

a receiver that receives a message indicating a base station to which uplink data are to be transmitted;

a processor configured to determine which of the different base stations is a base station to which uplink data are to be transmitted according to the received message; and a transmitter that transmits uplink data to the determined base station, wherein the message is a Radio Resource Control (RRC) Connection Reconfiguration message including a Packet Data Convergence Protocol Configuration (PDCP-Config), and wherein the PDCP-Config comprises a field that indicates the base station to which uplink data are to be transmitted.

2. The mobile station as claimed in claim 1, wherein the processor determines that both a base station of a primary cell and a base station of a secondary cell are base stations to which uplink data are to be transmitted, when the received message does not indicate the base station to which uplink data are to be transmitted.

3. An uplink data transmission method in a mobile station which performs communication over component carriers belonging to different base stations, comprising the steps of:

receiving a message that is a Radio Resource Control (RRC) Connection Reconfiguration message including a Packet Data Convergence Protocol Configuration (PDCP-Config);

determining which of the different base stations is a base station to which uplink data are to be transmitted according to the received message; and transmitting uplink data to the determined base station, wherein the PDCP-Config comprises a field that indicates the base station to which uplink data are to be transmitted.

4. A mobile station which performs communication over a component carrier belonging to a base station of a primary cell and a component carrier belonging to a base station of a secondary cell which is different from the primary cell, comprising:

a receiver that receives a message that is a Radio Resource Control (RRC) Connection Reconfiguration message including a Packet Data Convergence Protocol Configuration (PDCP-Config);

a processor configured to determine which of the base stations of the primary cell and the secondary cell is a base station to which uplink data are to be transmitted according to the received message; and a transmitter that transmits uplink data to the determined base station, wherein the PDCP-Config comprises a field that indicates the base station to which uplink data are to be transmitted.

5. The mobile station as claimed in claim 4, wherein the processor determines that both a base station of a primary cell and a base station of a secondary cell are base stations to which uplink data are to be transmitted, when the received message does not indicate the base station to which uplink data are to be transmitted.

6. An uplink data transmission method in a mobile station which performs communication over a component carrier belonging to a base station of a primary cell and a component carrier belonging to a base station of a secondary cell which is different from the primary cell, comprising the steps of:

receiving a message that is a Radio Resource Control (RRC) Connection Reconfiguration message including a Packet Data Convergence Protocol Configuration (PDCP-Config);

determining which of the base stations of the primary cell and the secondary cell is a base station to which uplink data are to be transmitted according to the received message; and transmitting uplink data to the determined base station, wherein the PDCP-Config comprises a field that indicates the base station to which uplink data are to be transmitted.

* * * * *